United States Patent
Lai et al.

(10) Patent No.: US 11,987,210 B2
(45) Date of Patent: May 21, 2024

(54) CONNECTING ROD STRUCTURE, FOOTBOARD DEVICE, AND VEHICLE

(71) Applicant: WINBO-Dongjian Automotive Technology Co., Ltd., Guangdong (CN)

(72) Inventors: Peiquan Lai, Guangdong (CN); Yongxin Liang, Guangdong (CN); Yongbo Chen, Guangdong (CN); Jie Yang, Guangdong (CN)

(73) Assignee: WINBO—Dongjian Automotive Technology Co., Ltd., Foshan (CN)

( * ) Notice: Subject to any disclaimer, the term of this patent is extended or adjusted under 35 U.S.C. 154(b) by 51 days.

(21) Appl. No.: 17/889,412

(22) Filed: Aug. 17, 2022

(65) Prior Publication Data

US 2023/0150436 A1   May 18, 2023

Related U.S. Application Data

(63) Continuation-in-part of application No. PCT/CN2021/133824, filed on Nov. 29, 2021.

(30) Foreign Application Priority Data

Nov. 15, 2021  (CN) .......................... 202111351560.8

(51) Int. Cl.
*B60R 3/02*   (2006.01)
(52) U.S. Cl.
CPC ..................................... *B60R 3/02* (2013.01)

(58) Field of Classification Search
CPC .............. B60R 3/00; B60R 3/02; B60R 3/002
See application file for complete search history.

(56) References Cited

U.S. PATENT DOCUMENTS

| | | | | |
|---|---|---|---|---|
| 1,129,956 A | * | 3/1915 | Chapman | B60R 3/02 105/449 |
| 2,487,921 A | * | 11/1949 | Culver | B60R 3/02 182/89 |
| 3,095,216 A | * | 6/1963 | Browne | B60R 3/02 280/166 |
| 4,623,160 A | * | 11/1986 | Trudell | B60R 3/02 182/127 |
| 8,056,913 B2 | * | 11/2011 | Kuntze | B60R 3/002 280/166 |

(Continued)

FOREIGN PATENT DOCUMENTS

| | | | | | |
|---|---|---|---|---|---|
| CN | 104709181 A | * | 6/2015 | | |
| CN | 105711505 A | * | 6/2016 | ............ | B60R 3/002 |

*Primary Examiner* — James A English

(57) ABSTRACT

Disclosed are a connecting rod structure, a footboard device, and a vehicle including same. A first connecting rod includes a first end pivotally connected with a second seat through a first pivot shaft, and a second end hinged with a first end of a second connecting rod; a spring includes a first end pivotally connected with the second seat through a second pivot shaft, and a second end pivotally connected with the first connecting rod or the second connecting rod through a third pivot shaft; a distance between an axis of the first pivot shaft and an axis of the third pivot shaft is a first distance, and a distance between the axis of the first pivot shaft and an axis of the second pivot shaft is a second distance; and a sum of the first distance and a free length of the spring is greater than the second distance.

18 Claims, 6 Drawing Sheets

(56) References Cited

U.S. PATENT DOCUMENTS

2008/0231076 A1* 9/2008 Plavetich .................. B60R 3/02
 296/183.1
2009/0308688 A1* 12/2009 Tayar ........................ E06C 1/38
 182/89
2010/0320714 A1* 12/2010 Webb ........................ B60R 3/02
 280/166
2023/0356659 A1* 11/2023 Chen ......................... B60R 3/02

* cited by examiner

CONNECTING ROD STRUCTURE, FOOTBOARD DEVICE, AND VEHICLE

CROSS REFERENCE TO RELATED APPLICATIONS

The present application is a Continuation-In-Part application of PCT Application No. PCT/CN2021/133824 filed on Nov. 29, 2021, which claims the benefit of Chinese Patent Application No. 202111351560.8 filed on Nov. 15, 2021. All the above are hereby incorporated by reference in their entirety.

TECHNICAL FIELD

The present disclosure relates to a technical field of vehicle accessories, and in particular to a connecting rod structure, a footboard device, and a vehicle including same.

BACKGROUND

A vehicle footboard is provided under a vehicle chassis for people to get on or off the vehicle. There have been two types of mainstream footboards, including a fixed footboard (namely the position of the footboard on a vehicle is fixed), and an electric lifting footboard (namely the footboard is extended under driving of a motor when needed, but retracted and concealed under the vehicle chassis when not used). The mainstream electric footboard is extended or retracted by driving a four-rod linkage mechanism through the motor. However, under a same occupied space, the electric four-rod linkage mechanism has a small travel and a low universality. The motor has a high cost and is easily damaged when working in a harsh environment, thus a high maintenance cost and a high requirement in a service environment are needed.

SUMMARY

An objective of the present disclosure is to provide a connecting rod structure having strong applicability and a low requirement in a service environment and capable of being extended or retracted easily, a footboard device, and a vehicle including same.

To achieve the above objective, the present disclosure provides a connecting rod structure, including: a mounting plate, a spring, a first connecting rod, a first seat provided on the mounting plate, a rotating sleeve pivotally connected with the first seat and provided with a sliding channel, a second connecting rod slidably provided in the sliding channel, and a second seat provided on the mounting plate, where the first connecting rod includes a first end pivotally connected with the second seat through a first pivot shaft, and a second end hinged with a first end of the second connecting rod; the spring includes a first end pivotally connected with the second seat through a second pivot shaft, and a second end pivotally connected with the first connecting rod or the second connecting rod through a third pivot shaft; the first pivot shaft, the second pivot shaft and the third pivot shaft are parallel to each other; a distance between an axis of the first pivot shaft and an axis of the third pivot shaft is a first distance, a distance between the axis of the first pivot shaft and an axis of the second pivot shaft is a second distance; and a sum of the first distance and a free length of the spring is greater than the second distance.

Optionally, the mounting plate may be flat; both the first seat and the second seat may be connected with a bottom wall of the mounting plate; and the first connecting rod may be connected with the second seat.

Optionally, the second seat may include: a first plate provided on the mounting plate and a second plate provided on the mounting plate; both the first plate and the second plate may be perpendicular to the first pivot shaft; the first pivot shaft may include one end provided on the first plate, and the other end provided on the second plate; and the first connecting rod may be connected with the first pivot shaft between the first plate and the second plate.

Optionally, the number of the springs may be two.

Optionally, the connecting rod structure may further include: a first stop block and a second stop block, where the axis of the first pivot shaft may be located between the first stop block and the second stop block; both the first stop block and the second stop block may be located on a plane where the first connecting rod rotates; the first stop block may include a first stop surface; the first stop surface may abut against the first connecting rod; the second stop block may include a second stop surface; and the second stop surface may abut against the second connecting rod.

Optionally, when the first stop surface abuts against the first connecting rod, the spring may be compressed.

Optionally, when the second stop surface abuts against the second connecting rod, the spring may be compressed.

Optionally, the spring may be a compression gas spring.

The present disclosure further provides a footboard device, including: a footboard, and the connecting rod structure described above, where the footboard is fixedly connected with a second end of the second connecting rod.

The present disclosure further provides a vehicle, including: a vehicle body, and the footboard device described above, where the mounting plate is provided on a chassis of the vehicle body; and the first connecting rod, the first seat, and the second seat are located under the chassis.

The connecting rod structure, the footboard device, and the vehicle including same provided by the embodiments of the present disclosure have the following beneficial effects over the prior art:

The present disclosure solves the problems of high cost, small travel and low universality of the electric four-rod mechanism. Compared with the four-rod structure, the connecting rod structure has a simpler structure, a stronger universality, a larger adjustable travel, a lower requirement in a service environment, a lower cost, fewer parts, and higher production efficiency. When the footboard device is provided on the chassis, the user can upwardly push the second end of the second connecting rod or downwardly press the second end of the second connecting rod to extend or retract the footboard easily.

Figure 1:
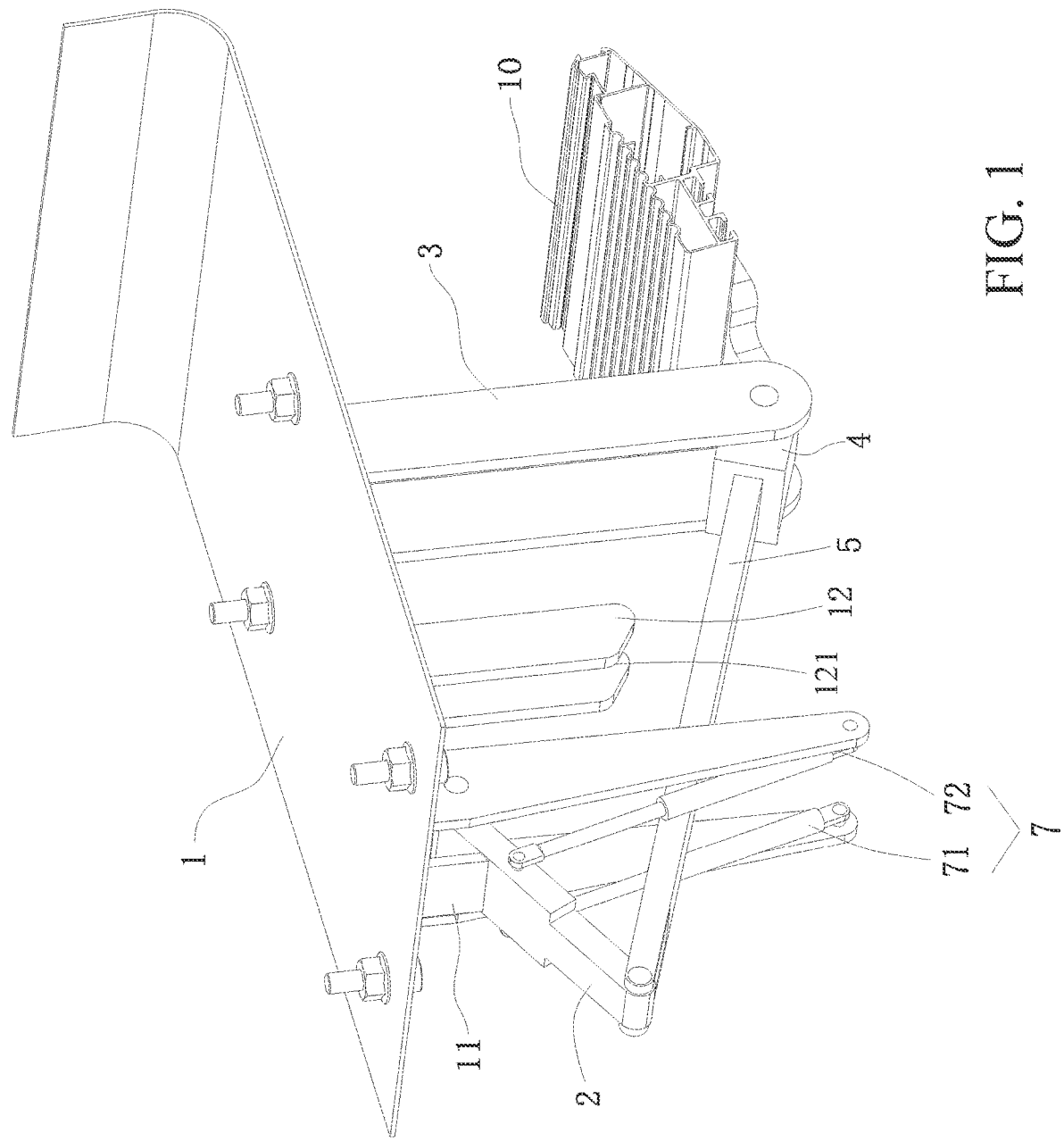
FIG. 1 is a schematic structural view illustrating a retracted state of a connecting rod structure according to an embodiment of the present disclosure.

In the figure: 1: mounting plate, 2: first connecting rod, 3: first seat, 4: rotating sleeve, 5: second connecting rod, 6: second seat, 61: first plate, 62: second plate, 7: spring, 71: first compression gas spring, 72: second compression gas spring, 10: footboard, 11: first stop block, 111: first stop surface, 12: second stop block, 121: second stop surface, 13: first pivot shaft, 14: second pivot shaft, 15: third pivot shaft, 20: sliding channel, 21: first end of the first connecting rod, 22: second end of the first connecting rod, 51: first end of the second connecting rod, 52: second end of the second connecting rod, 73: first end of the spring, 74: second end of the spring, 101: bottom wall of the mounting plate, 301: third plate, 302: fourth plate, L1: first distance, L2: second distance, 16: vehicle body, and 17: chassis.

DETAILED DESCRIPTION

The specific implementations of the present disclosure are described in more detail below with reference to the accompanying drawings and embodiments. The following embodiments are intended to illustrate the present disclosure, rather than to limit the scope of the present disclosure.

It is to be noted that orientations such as top, bottom, upward and downward used herein are defined based on the directions in the drawings. They are relative concepts and thus can change according to different positions and different using states. These or other orientations should not be construed as limiting terms.

It is to be noted that the term "include" does not exclude other elements or steps, and the term "a" or "an" does not exclude a plural form.

In addition, it is further to be noted that, for any single technical feature described or implied in the embodiments of the present disclosure, or any single technical feature illustrated or implied in the accompanying drawings, these technical features (or equivalents thereof) can still be combined continuously to obtain other embodiments not directly mentioned in the present disclosure.

It should be further understood that the terms such as "first", "second", and the like are used in the present disclosure to describe various information, but the information should not be limited to these terms, and these terms are only used to distinguish the same type of information from each other. For example, without departing from the scope of the present disclosure, "first" information may be referred to as "second" information, and similarly, "second" information may be referred to as "first" information.

Figure 3:
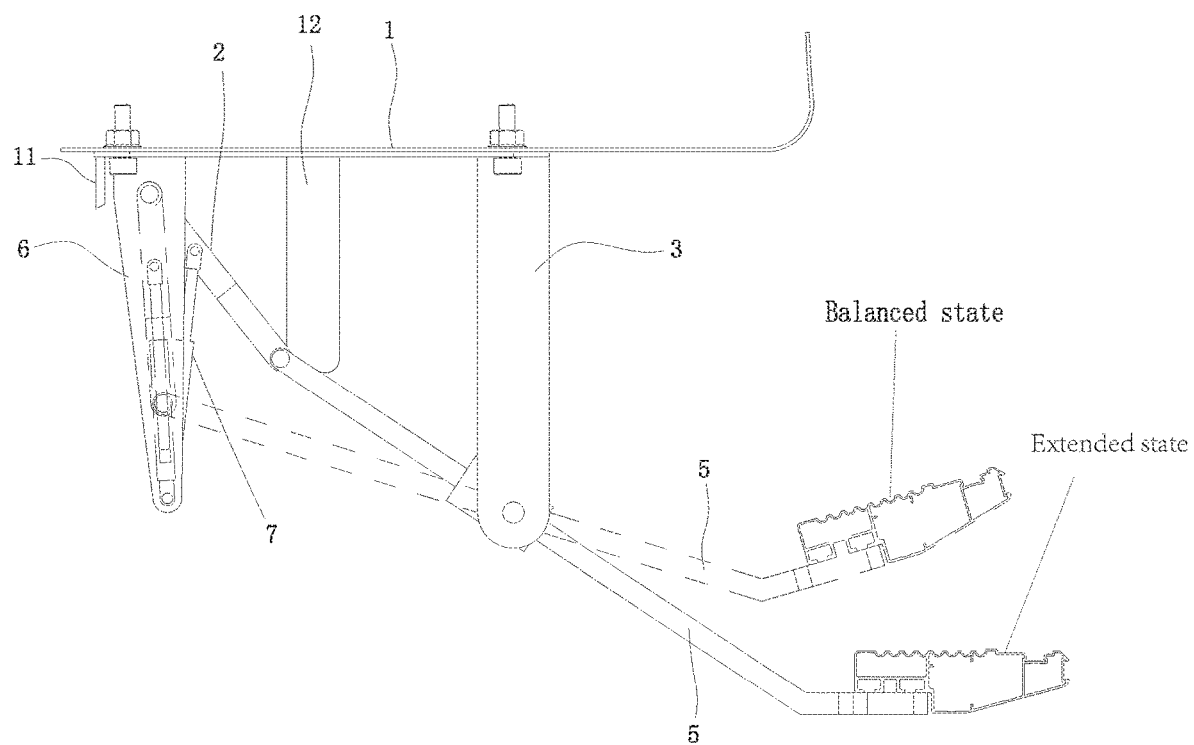
FIG. 3 is a schematic structural view illustrating a balanced state and an extended state of a connecting rod structure according to an embodiment of the present disclosure.
Figure 4:
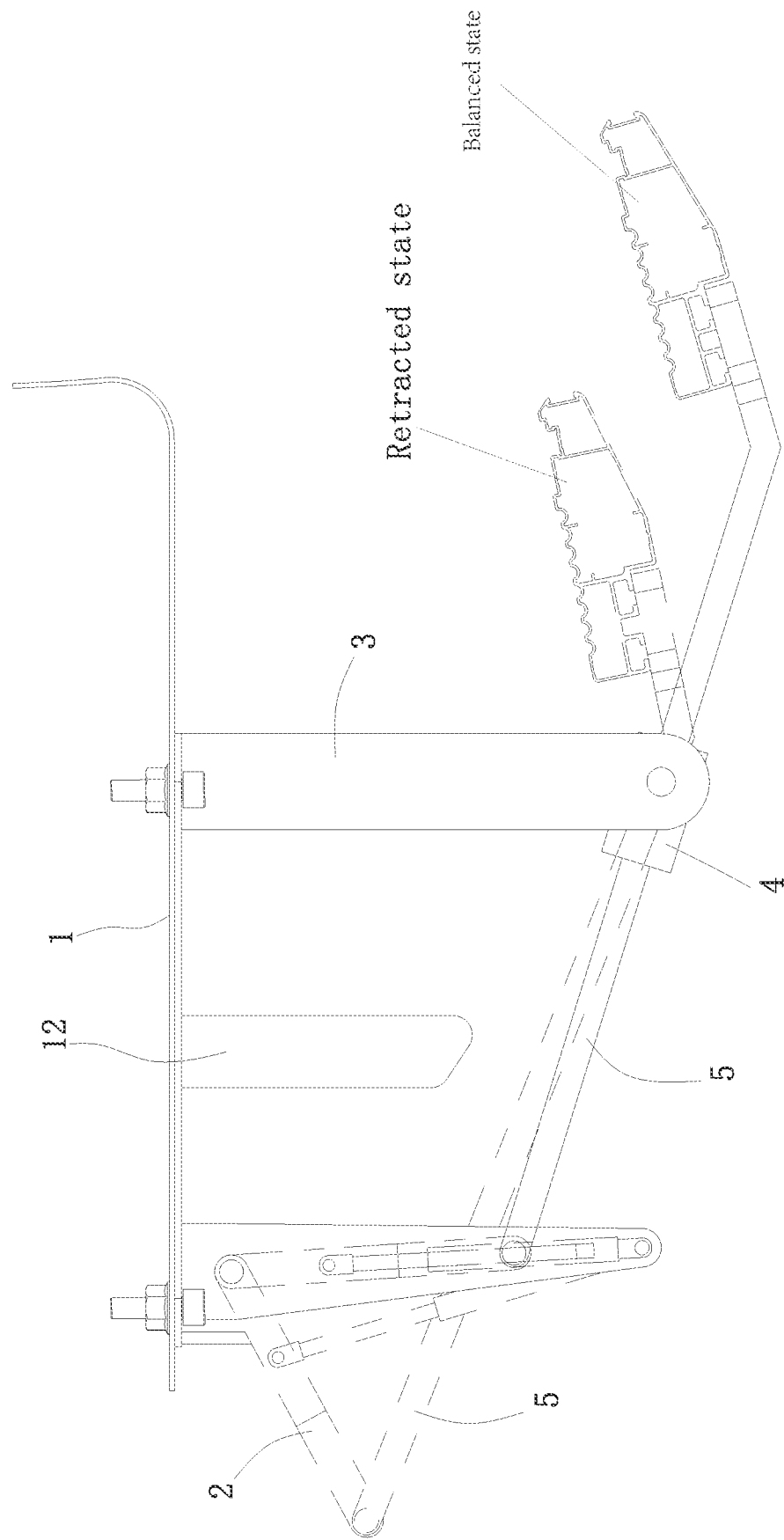
FIG. 4 is a schematic structural view illustrating a balanced state and a retracted state of a connecting rod structure according to an embodiment of the present disclosure.
Figure 5:
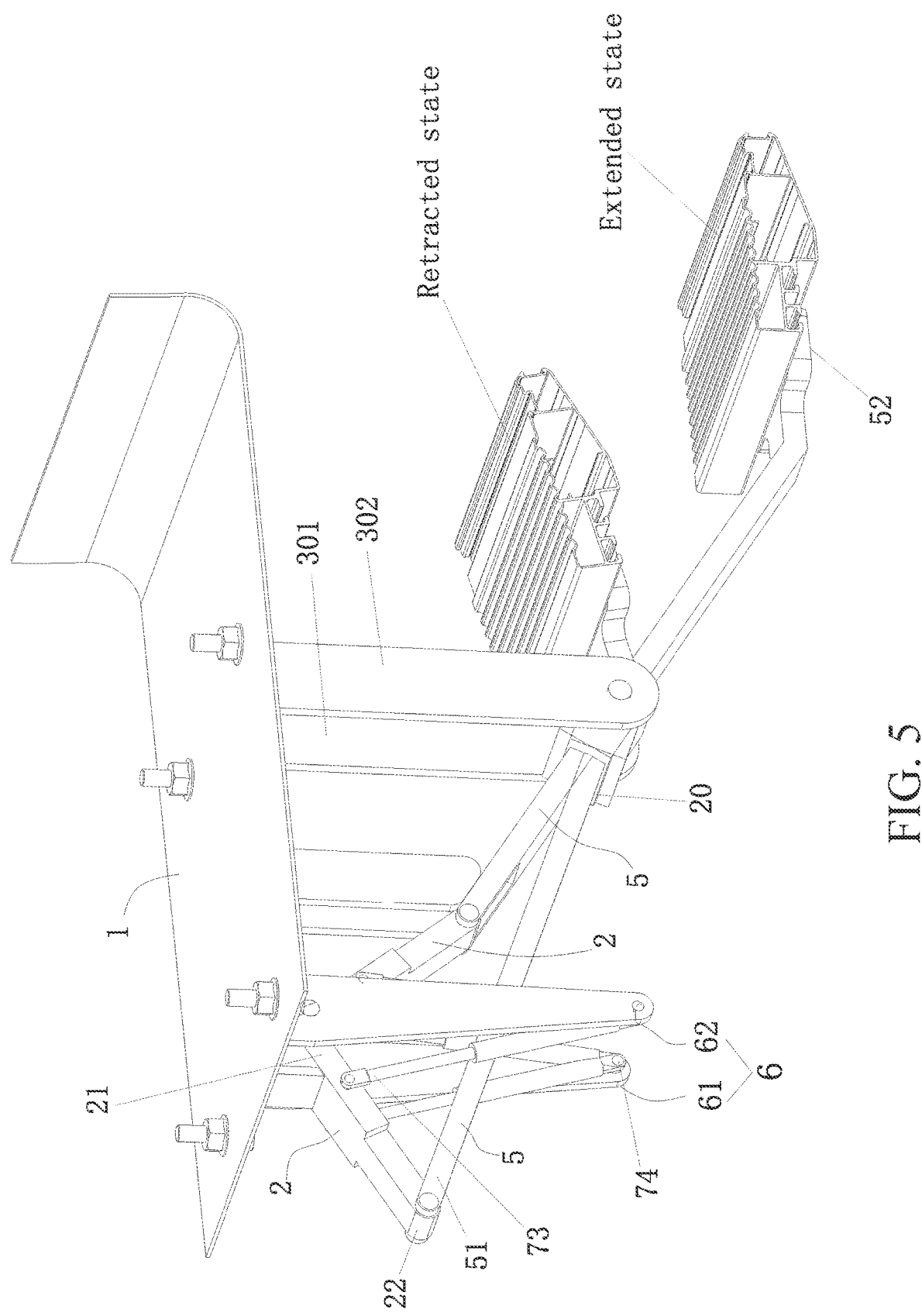
FIG. 5 is a schematic structural view illustrating an extended state and a retracted state of a connecting rod structure according to an embodiment of the present disclosure.

It is to be noted that the same reference numeral refers to the same or approximately the same component in different drawings, FIG. 3 is a schematic view illustrating a balanced state and an extended state for a first connecting rod 2, a second connecting rod 5 and a spring 7 in a connecting rod structure according to the present disclosure. FIG. 4 is a schematic view illustrating a balanced state and a retracted state for a first connecting rod 2, a second connecting rod 5 and a spring 7 in a connecting rod structure according to the present disclosure. FIG. 5 is a schematic view illustrating an extended state and a retracted state for a first connecting rod 2, a second connecting rod 5 and a spring 7 in a connecting rod structure according to the present disclosure.

As shown in FIGS. 1-5, a connecting rod structure according to a preferred embodiment of the present disclosure includes: a mounting plate 1, a spring 7, a first connecting rod 2, a first seat 3 provided on the mounting plate 1, a rotating sleeve 4 pivotally connected with the first seat 3 and provided with a sliding channel 20, a second connecting rod 5 slidably provided in the sliding channel 20, and a second seat 6 provided on the mounting plate 1.

The first connecting rod includes a first end 21 pivotally connected with the second seat 6 through a first pivot shaft 13, and a second end 22 hinged with a first end 51 of the second connecting rod. The spring includes a first end 73 pivotally connected with the second seat 6 through a second pivot shaft 14, and a second end 74 pivotally connected with the first connecting rod 2 or the second connecting rod 5 through a third pivot shaft 15, namely the solution of the present disclosure can be implemented by pivotally connecting the second end 74 of the spring with the first connecting rod 2 or the second connecting rod 5. The first pivot shaft 13, the second pivot shaft 14, and the third pivot shaft 15 are parallel to each other. A distance between an axis of the first pivot shaft 13 and an axis of the third pivot shaft 15 is a first distance L1, and a distance between the axis of the first pivot shaft 13 and an axis of the second pivot shaft 14 is a second distance L2. A sum of the first distance L1 and a free length of the spring 7 is greater than the second distance L2.

With the case where the second end 74 of the spring is pivotally connected with the first connecting rod 2 through the third pivot shaft 15 as an example for description, referring to FIG. 5, the connecting rod structure has an extended state or a retracted state, in which the second end 52 of the second connecting rod can be extended or retracted. The free length of the spring 7 refers to a length of the spring 7 in a natural state, while the minimum extended length of the spring refers to a length that the spring 7 is compressed to a minimum. In response to the retracted state of the connecting rod structure, the second end 22 of the first connecting rod is located at a side of the second seat 6 away from the first seat 3. When the sum of the extended length of the spring 7 and the first distance L1 is the same as the second distance L2, the spring 7 is compressed. Consequently, when the second end 22 of the first connecting rod needs to pass through a connecting line between the first end 21 of the first connecting rod and the first end 73 of the spring, an external force is required. In case of no external force, the elastic structure of the compression spring 7 applies a support force to the first connecting rod 2, and the support force is deviated from the first seat 3. As a result, the second end 22 of the first connecting rod is always located at the side of the second seat 6 away from the first seat 3, namely the distance between the second end 52 of the second connecting rod and the first seat 3 is shortest, and the connecting rod structure is in the retracted state.

Referring to FIG. 3 and FIG. 4, when the connecting rod structure is switched from the retracted state to the extended state, the second connecting rod 5 is pulled by an external force, such that the second connecting rod 5 moves to a direction away from the second seat 6 (or the second end 52 of the second connecting rod is pressed downwardly by an external force), and the second end 22 of the first connecting rod passes through the connecting line between the first end 21 of the first connecting rod and the first end 73 of the spring. Thereafter, the elastic structure of the compression spring 7 applies a support force to the first connecting rod 2 (the support force comes from compression stored energy of the spring 7), and the support force faces to the first seat 3. With the support force, the second end 22 of the first connecting rod moves to a direction close to the first seat 3, thereby driving the second connecting rod 5 to rotate around the rotating sleeve 4 and extending the rotating sleeve 4 to a direction away from the first seat 3, namely the distance between the second end 52 of the second connecting rod and the first seat 3 is extended, and the connecting rod structure is in the extended state.

Referring to FIG. 3 and FIG. 4, when the connecting rod structure is switched from the extended state to the retracted state, the second connecting rod 5 is pulled by an external force, such that the second connecting rod 5 moves to a direction close to the second seat 6 (or the second end 52 of the second connecting rod is pushed upwardly by an external force), and the second end 22 of the first connecting rod passes through the connecting line between the first end 21 of the first connecting rod and the first end 73 of the spring. Thereafter, the elastic structure of the compression spring 7 applies a support force to the first connecting rod 2 (the support force comes from compression stored energy of the spring 7), and the support force is deviated from the first seat 3. As a result, the second end 22 of the first connecting rod is always located at the side of the second seat 6 away from the first seat 3, namely the distance between the second end 52 of the second connecting rod and the first eat 3 is shortened, and the connecting rod structure is in the retracted state.

In another embodiment, referring to FIG. 5, the connecting rod structure has an extended state or a retracted state, in which the second end 52 of the second connecting rod can be extended or retracted. The free length of the spring 7 refers to a length of the spring 7 in a natural state, while the minimum extended length of the spring refers to a length that the spring 7 is compressed to a minimum. In response to the retracted state of the connecting rod structure, the second end 22 of the first connecting rod is located at a side of the second seat 6 away from the first seat 3. When the sum of the extended length of the spring 7 and the first distance L1 is the same as the second distance L2, the spring 7 is compressed. Consequently, when the second end 22 of the first connecting rod needs to pass through a connecting line between the first end 21 of the first connecting rod and the first end 73 of the spring, an external force is required. In case of no external force, when the second end 74 of the spring is pivotally connected with the second connecting rod 5 through the third pivot shaft 15, the elastic structure of the compression spring 7 applies a support force to the first connecting rod 5, and the support force is deviated from the first seat 3. As a result, the second end 52 of the second connecting rod is always located at the side of the second seat 6 away from the first seat 3, namely the distance between the second end 52 of the second connecting rod and the first seat 3 is shortest, and the connecting rod structure is in the retracted state.

When the second end 74 of the spring is pivotally connected with the second connecting rod 5 through the third pivot shaft 15, and the connecting rod structure is switched from the retracted state to the extended state, the second connecting rod 5 is pulled by an external force, such that the second connecting rod 5 moves to a direction away from the second seat 6 (or the second end 52 of the second connecting rod is pressed downwardly by an external force), and the second end 22 of the first connecting rod passes through the connecting line between the first end 21 of the first connecting rod and the first end 73 of the spring. Thereafter, the elastic structure of the compression spring 7 applies a support force to the second connecting rod 5 (the support force comes from compression stored energy of the spring 7), and the support force faces to the first seat 3. With the support force, the first end 51 of the second connecting rod moves to a direction close to the first seat 3, thereby driving the second connecting rod 5 to rotate around the rotating sleeve 4 and extending the rotating sleeve 4 to a direction away from the first seat 3, namely the distance between the second end 52 of the second connecting rod and the first seat 3 is extended, and the connecting rod structure is in the extended state.

Referring to FIG. 3 and FIG. 4, when the connecting rod structure is switched from the extended state to the retracted state, the second connecting rod 5 is pulled by an external force, such that the second connecting rod 5 moves to a direction close to the second seat 6 (or the second end 52 of the second connecting rod is pushed upwardly by an external force), and the second end 22 of the first connecting rod passes through the connecting line between the first end 21 of the first connecting rod and the first end 73 of the spring. Thereafter, the elastic structure of the compression spring 7 applies a support force to the second connecting rod 5 (the support force comes from compression stored energy of the spring 7), and the support force is deviated from the first seat 3. As a result, the second end 22 of the first connecting rod is always located at the side of the second seat 6 away from the first seat 3, namely the distance between the second end 52 of the second connecting rod and the first eat 3 is shortened, and the connecting rod structure is in the retracted state.

The first connecting rod 2 or the second connecting rod 5 is supported with the compression stored energy of the spring 7, such that the second connecting rod 5 is extended from or retracted to the limiting sleeve. The connecting rod structure solves the problems of a high cost, a small travel and a low universality of a conventional motor mechanism, and has a stronger universality, a larger adjustable travel, a lower requirement in a service environment, a lower product cost, fewer parts, and higher production efficiency.

In an embodiment, referring to FIG. 1, the spring 7 is a compression gas spring 7. The spring can store energy when compressed. As a result, when the second end 22 of the first connecting rod passes through the connecting line between the first end 21 of the first connecting rod and the first end 73 of the spring, the first connecting rod 2 can be driven automatically with the compression stored energy.

It is to be understood that the extending end or cylinder end of the compression gas spring 7 may be pivotally connected with the first connecting rod 2 or pivotally connected with the second seat 6.

It is to be understood that the sliding channel 20 is perpendicular to a pivot axis of a pivot connection between the rotating sleeve 4 and the second seat 6.

In an embodiment, the mounting plate 1 is flat. Both the first seat 3 and the second seat 6 are connected with a bottom wall 101 of the mounting plate. The first connecting rod 2 is hinged on the second seat 6. The second seat 6, the first seat 3, and the second end 52 of the second connecting rod are arranged sequentially.

Specifically, referring to FIG. 5, the second seat 6 includes: a first plate 61 provided on the mounting plate 1 and a second plate 62 provided on the mounting plate 1. Both the first plate 61 and the second plate 62 are perpendicular to the first pivot shaft 13. The first pivot shaft 13 includes one end provided on the first plate 61, and the other end provided on the second plate 62. The first connecting rod 2 is connected with the first pivot shaft 13 between the first plate 61 and the second plate 62.

Referring to FIG. 1, there are two springs 7, including a first compression gas spring 71 and a second compression gas spring 72. With the first compression gas spring 71 and the second compression gas spring 72, the connecting rod structure is larger in compression stored energy, more stable, and more responsive to support the first connecting rod 2. The first compression gas spring 71 and the second compression gas spring 72 are located at two opposite sides of the first connecting rod 2, which can effectively prevent the deformation of the second connecting rod 2 due to the non-uniform stress.

Optionally, the first seat 3 includes: a third plate 301 and a fourth plate 302. Both the third plate 301 and the fourth plate 302 are perpendicular to the mounting plate 1. The first plate 61, the second plate 62, the third plate 301, and the fourth plate 302 are parallel to each other. The rotating sleeve 4 is located between the third plate 301 and the fourth plate 302. Two opposite sides of the rotating sleeve 4 are pivotally connected with inner sidewalls of the third plate 301 and the fourth plate 302 through a rotating shaft.

In the description of the present disclosure, the spring 7 keeps compressed all the time. Hence, no matter whether the connecting rod structure is in the extended state or the retracted state, the first connecting rod 2 can abut against the bottom wall 101 of the mounting plate, which ensures that the whole connecting rod structure does not shake easily in case of no external force.

Optionally, when the first connecting rod 2, the first compression gas spring 71, and the second compression gas spring 72 are collinear, the connecting rod structure is in the balanced state (the first connecting rod 2, the first compression gas spring 71, and the second compression gas spring 72 are collinear all the time in case of no external force). That is, when they are located on the connecting line between the first end 21 of the first connecting rod and the first end 73 of the spring, the spring 7 is compressed to the minimum. In other words, the first compression gas spring 71 and the second compression gas spring 72 each have the largest compression stored energy, thereby better supporting the first connecting rod 2.

Figure 2:
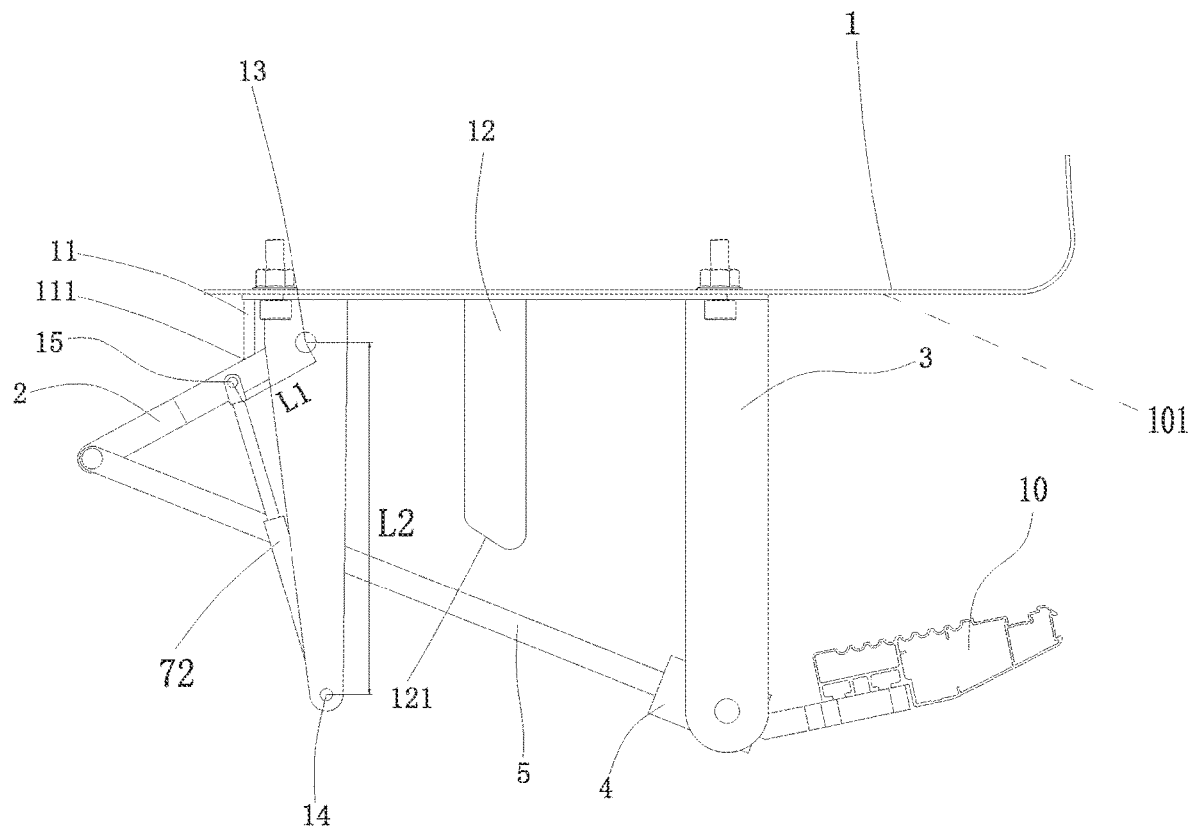
FIG. 2 is a schematic structural view illustrating a retracted state of a connecting rod structure according to an embodiment of the present disclosure.

In an embodiment, referring to FIG. 2, the connecting rod structure further includes: a first stop block 11 and a second stop block 12. The axis of the first pivot shaft 13 is located between the first stop block 11 and the second stop block 12. Both the first stop block 11 and the second stop block 12 are located on a plane where the first connecting rod 2 rotates. The first stop block 11 includes a first stop surface 111. The first stop surface 111 may abut against the first connecting rod 2. The second stop block 12 includes a second stop surface 121. The second stop surface 121 may abut against the second connecting rod 5. That is, the sidewall of the first connecting rod 2 abuts against the first stop surface 111 through the spring 7 when the connecting rod structure is in the retracted state, and the sidewall of the second connecting rod 5 abuts against the second stop surface 121 through the spring 7 when the connecting rod structure is in the extended state, which ensures that the whole connecting rod structure does not shake easily in case of no external force.

When the sidewall of the first connecting rod 2 abuts against the first stop surface 111 through the spring 7, the sidewall of the first connecting rod 2 is matched with the first stop surface 111. That is, the first stop surface 111 is a groove matched with the sidewall of the first connecting rod 2, such that the first connecting rod 2 abuts against the first stop surface 111 more stably.

Optionally, when the first stop surface 111 abuts against the first connecting rod 2, the spring 7 is compressed, such that the first connecting rod 2 is pressed tightly on the first stop surface 111.

When the sidewall of the first connecting rod 5 abuts against the second stop surface 121 through the spring 7, the sidewall of the first connecting rod 5 is matched with the second stop surface 121. That is, the second stop surface 121 is a groove matched with the sidewall of the second connecting rod 5, such that the second connecting rod 5 abuts against the second stop surface 121 more stably.

Optionally, when the second stop surface 121 abuts against the second connecting rod 5, the spring 7 is compressed, such that the second connecting rod 5 is pressed tightly on the second stop surface 121.

Figure 6:
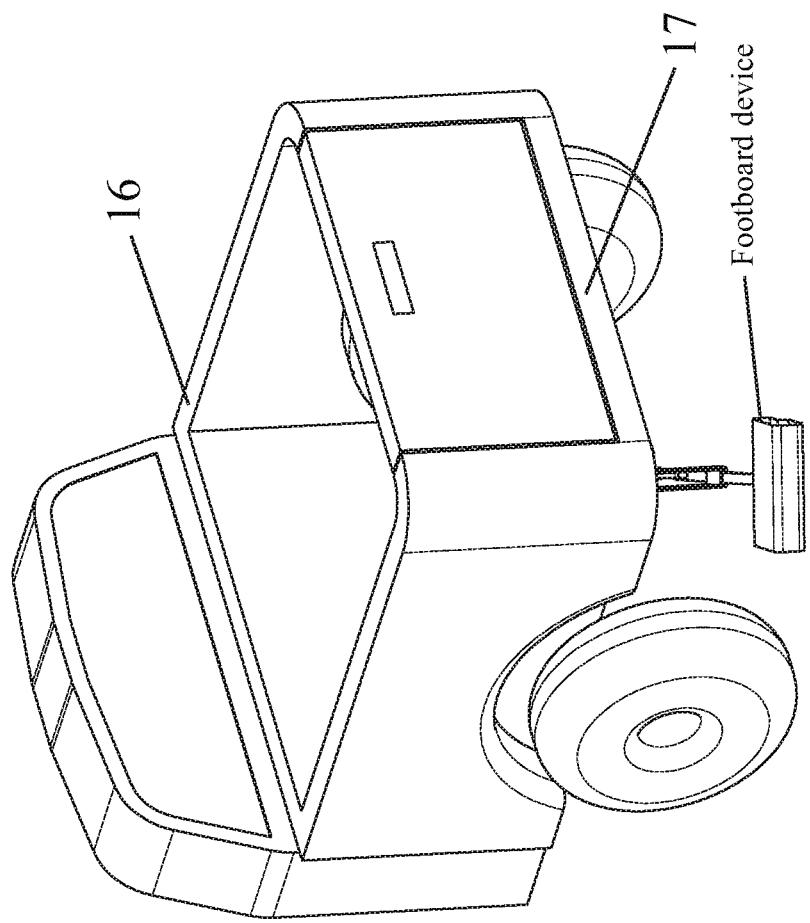
FIG. 6 is a schematic structural view illustrating a vehicle body and a footboard device according to an embodiment of the present disclosure.

Referring to FIGS. 1-5, an embodiment of the present disclosure further provides a footboard device, including: a footboard 10, and the connecting rod structure described above. The footboard 10 is fixedly connected with the second end 52 of the second connecting rod. The footboard 10 is extended or retracted by driving the second end 52 of the second connecting rod for extension or retraction As shown in FIG. 6, an embodiment of the present disclosure further provides a vehicle, including: a vehicle body 16, and the footboard device described above. The mounting plate 1 is provided on a chassis 17 of the vehicle body 16. The first connecting rod 2, the first seat 3, and the second seat 6 are located under the chassis 17. The user can downwardly press or upwardly push the second end 52 of the second connecting rod, such that the connecting rod structure is switched between the extended state and the retracted state. When the connecting rod structure is in the retracted state, the footboard 10 is located fittingly below the chassis 17. When the connecting rod structure is in the extended state, the footboard 10 is extended from the chassis 17 for use. The mounting plate 1 may further be provided at the hopper or other necessary places.

In conclusion, the connecting rod structure, the footboard device, and the vehicle including same provided by the embodiments of the present disclosure solve the problems of high cost, small travel and low universality of the electric four-rod mechanism. Compared with the four-rod structure, the connecting rod structure has a simpler structure, a stronger universality, a larger adjustable travel, a lower requirement in a service environment, a lower cost, fewer parts, and higher production efficiency. When the footboard device is provided on the chassis 17, the user can upwardly push the second end 52 of the second connecting rod or downwardly press the second end 52 of the second connecting rod to extend or retract the footboard 10 easily.

The above are only preferred implementations of the present disclosure. It should be noted that several improvements and replacements may further be made by those of ordinary skill in the art without departing from the principle of the present disclosure, and such improvements and replacements should also be deemed as falling within the protection scope of the present disclosure.

The invention claimed is:

1. A connecting rod structure, comprising: a mounting plate, a spring, a first connecting rod, a first seat provided on the mounting plate, a rotating sleeve pivotally connected with the first seat and provided with a sliding channel, a second connecting rod slidably provided in the sliding channel, and a second seat provided on the mounting plate, wherein the first connecting rod comprises a first end pivotally connected with the second seat through a first pivot shaft, and a second end hinged with a first end of the second connecting rod; the spring comprises a first end pivotally connected with the second seat through a second pivot shaft, and a second end pivotally connected with the first connecting rod through a third pivot shaft; the first pivot shaft, the second pivot shaft, and the third pivot shaft are parallel to each other; a distance between an axis of the first pivot shaft and an axis of the third pivot shaft is a first distance, and a distance between the axis of the first pivot shaft and an axis of the second pivot shaft is a second distance; and a sum of the first distance and a free length of the spring is greater than the second distance.

2. The connecting rod structure according to claim 1, wherein the mounting plate is flat; both the first seat and the second seat are connected with a bottom wall of the mounting plate; and the first connecting rod is hinged with the second seat.

3. The connecting rod structure according to claim 2, wherein the second seat comprises: a first plate provided on the mounting plate and a second plate provided on the mounting plate; both the first plate and the second plate are perpendicular to the first pivot shaft; the first pivot shaft comprises one end provided on the first plate, and the other end provided on the second plate; and the first connecting rod is connected with the first pivot shaft between the first plate and the second plate.

4. The connecting rod structure according to claim 3, wherein the connecting rod structure comprises two springs.

5. The connecting rod structure according to claim 1, further comprising: a first stop block and a second stop block, wherein the axis of the first pivot shaft is located between the first stop block and the second stop block; both the first stop block and the second stop block are located on a plane where the first connecting rod rotates; the first stop block comprises a first stop surface; the first stop surface abuts against the first connecting rod; the second stop block comprises a second stop surface; and the second stop surface abuts against the second connecting rod.

6. The connecting rod structure according to claim 5, wherein when the first stop surface abuts against the first connecting rod, or when the second stop surface abuts against the second connecting rod, the spring is compressed.

7. A footboard device, comprising: a footboard, and the connecting rod structure according to claim 1, wherein the footboard is fixedly connected with a second end of the second connecting rod.

8. A footboard device, comprising: a footboard, and the connecting rod structure according to claim 2, wherein the footboard is fixedly connected with a second end of the second connecting rod.

9. A footboard device, comprising: a footboard, and the connecting rod structure according to claim 3, wherein the footboard is fixedly connected with a second end of the second connecting rod.

10. A footboard device, comprising: a footboard, and the connecting rod structure according to claim 4, wherein the footboard is fixedly connected with a second end of the second connecting rod.

11. A footboard device, comprising: a footboard, and the connecting rod structure according to claim 5, wherein the footboard is fixedly connected with a second end of the second connecting rod.

12. A footboard device, comprising: a footboard, and the connecting rod structure according to claim 6, wherein the footboard is fixedly connected with a second end of the second connecting rod.

13. A vehicle, comprising: a vehicle body, and the footboard device according to claim 7, wherein the mounting plate is provided on a chassis of the vehicle body; and the first connecting rod, the first seat, and the second seat are located under the chassis.

14. A vehicle, comprising: a vehicle body, and the footboard device according to claim 8, wherein the mounting plate is provided on a chassis of the vehicle body; and the first connecting rod, the first seat, and the second seat are located under the chassis.

15. A vehicle, comprising: a vehicle body, and the footboard device according to claim 9, wherein the mounting plate is provided on a chassis of the vehicle body; and the first connecting rod, the first seat, and the second seat are located under the chassis.

16. A vehicle, comprising: a vehicle body, and the footboard device according to claim 10, wherein the mounting plate is provided on a chassis of the vehicle body; and the first connecting rod, the first seat, and the second seat are located under the chassis.

17. A vehicle, comprising: a vehicle body, and the footboard device according to claim 11, wherein the mounting plate is provided on a chassis of the vehicle body; and the first connecting rod, the first seat, and the second seat are located under the chassis.

18. A vehicle, comprising: a vehicle body, and the footboard device according to claim 12, wherein the mounting plate is provided on a chassis of the vehicle body; and the first connecting rod, the first seat, and the second seat are located under the chassis.

* * * * *